United States Patent
Nagasawa et al.

[11] Patent Number: 5,157,563
[45] Date of Patent: Oct. 20, 1992

[54] MAGNETIC RECORDING AND REPRODUCING APPARATUS USING AN ELECTROMAGNETIC ACTUATOR FOR AUTOMATIC TRACKING

[75] Inventors: Masato Nagasawa; Eiji Yokoyama, both of Nagaokakyo, Japan

[73] Assignee: Mitsubishi Denki Kabushiki Kaisha, Tokyo, Japan

[21] Appl. No.: 446,798

[22] Filed: Dec. 6, 1989

[30] Foreign Application Priority Data

Dec. 6, 1988 [JP] Japan .................. 63-309244
Dec. 6, 1988 [JP] Japan .................. 63-309246
Dec. 6, 1988 [JP] Japan .................. 63-309247

[51] Int. Cl.⁵ .................................. G11B 5/592
[52] U.S. Cl. .................. 360/77.16; 360/77.17
[58] Field of Search ............ 360/77.16, 77.17, 84

[56] References Cited

U.S. PATENT DOCUMENTS

| | | | |
|---|---|---|---|
| 3,126,535 | 3/1964 | Streeter | 360/77.17 |
| 4,080,636 | 3/1978 | Ravizza | 360/77.16 |
| 4,163,994 | 8/1979 | Sakamoto et al. | 360/77.16 |
| 4,229,773 | 10/1980 | Sakamoto . | |
| 4,327,384 | 4/1982 | Tomita et al. . | |
| 4,656,529 | 4/1987 | Sakamoto | 360/77.16 |
| 4,796,128 | 1/1989 | Takimoto | 360/84 |
| 4,882,635 | 11/1989 | Sanai | 360/77.16 |
| 4,970,611 | 11/1990 | Kodama et al. | 360/77.16 |

FOREIGN PATENT DOCUMENTS

| | | |
|---|---|---|
| 0117455 | 2/1984 | European Pat. Off. . |
| 54-113308 | 9/1979 | Japan .................. 360/77.16 |
| 60-106022 | 6/1985 | Japan .................. 360/77.16 |
| 1-53314 | 3/1989 | Japan .................. 360/77.16 |
| 1580008 | 5/1978 | United Kingdom . |

OTHER PUBLICATIONS

Patent Abstracts of Japan, vol.6, No. 125 (P-127) (1003) 10 Jul. 1982, & JP-A-57 (Tokyo Shibaura) 24 Mar. 1982.

Primary Examiner—Aristotelis Psitos
Assistant Examiner—David L. Robertson

[57] ABSTRACT

A magnetic recording and reproducing apparatus for performing automatic tracking in a video tape recorder of a helical scan type. A magnetic head is wobbled by an electromagnetically driven actuator in a transverse direction of a recording track, a tracking error signal is obtained by extracting a signal component attributable to this wobbling from a signal reproduced by the magnetic head, and the extracted signal component is fed back to the electromagnetically driven actuator. By setting the magnetic head width to 1-1.5 times the recording track width, a dead zone is made small, and the tracking error signal is obtained positively. In addition, by setting the frequency for driving the electromagnetically driven actuator at a level between a primary resonance frequency and a secondary resonance frequency and by subjecting the driving frequency to phase conversion, the driving frequency is converted into a high frequency to permit highly accurate tracking. Furthermore, any deviation in the tracking by a fixed magnetic head caused by a DC current and the like is prevented by extracting a low-frequency component containing a DC component from the tracking error signal and by feeding back that extracted signal to a capstan motor for driving a magnetic tape.

7 Claims, 15 Drawing Sheets

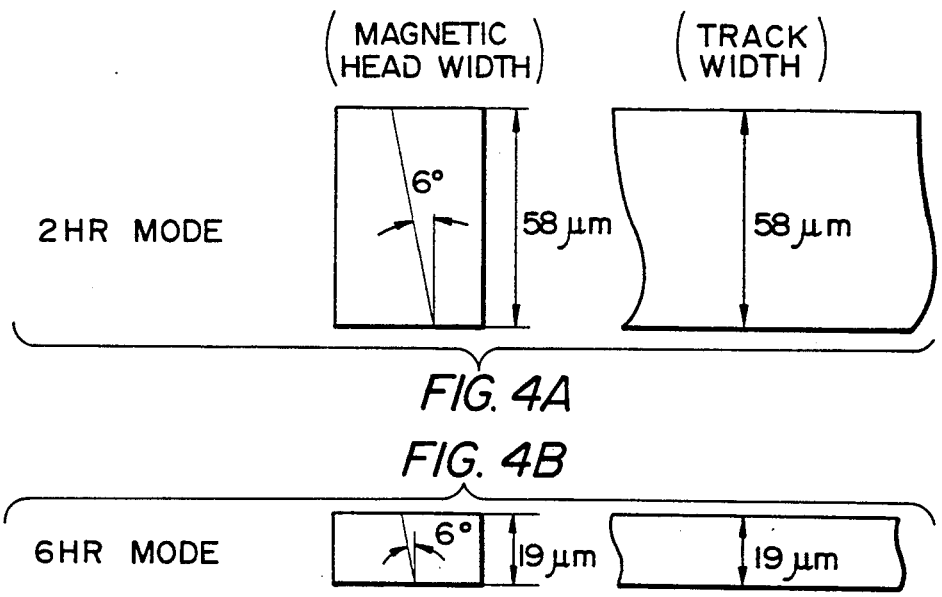
FIG. 4A
FIG. 4B
FIG. 6
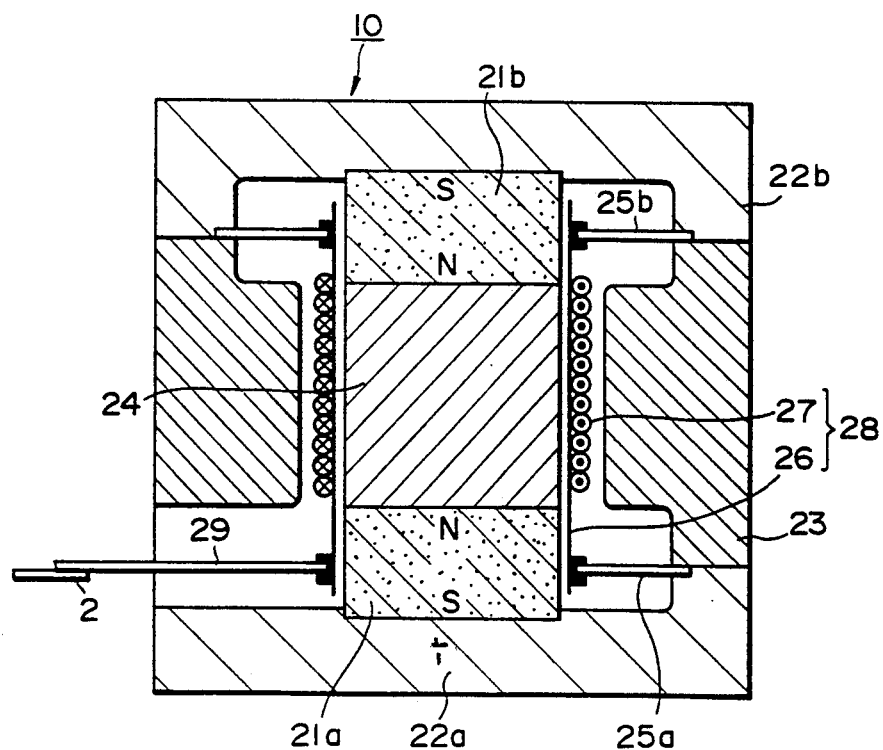

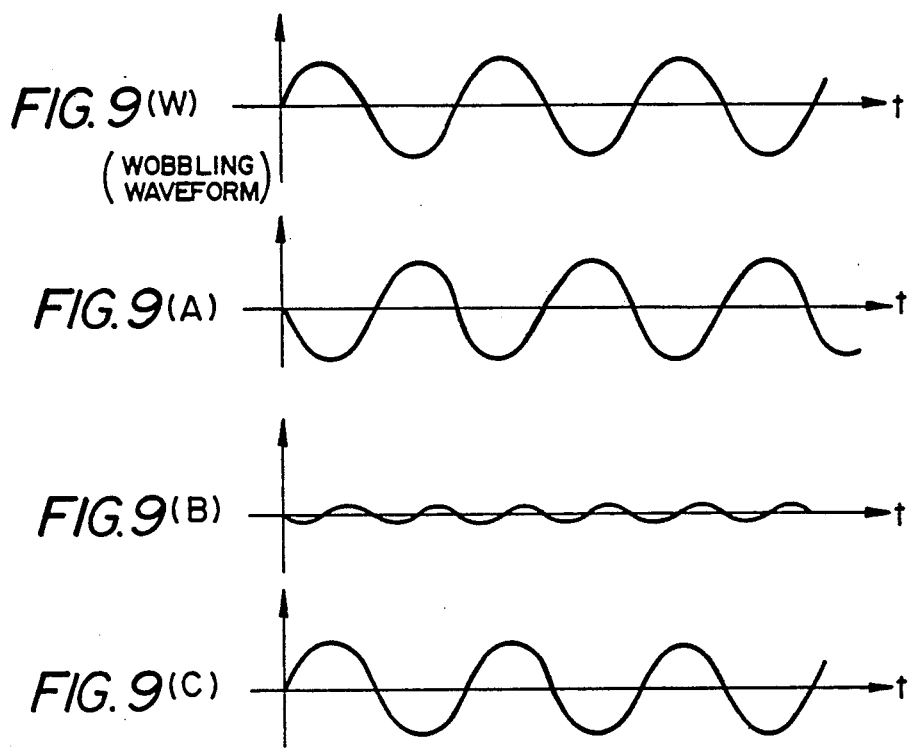
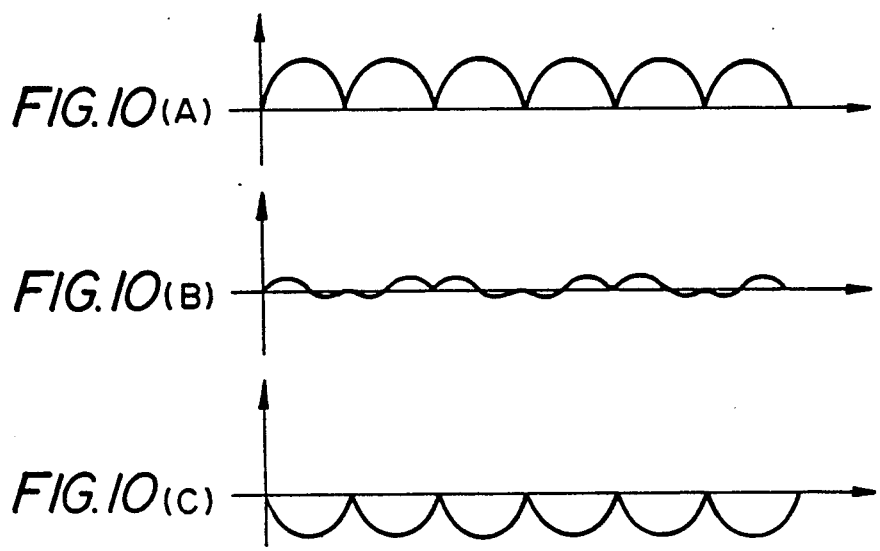

MAGNETIC RECORDING AND REPRODUCING APPARATUS USING AN ELECTROMAGNETIC ACTUATOR FOR AUTOMATIC TRACKING

BACKGROUND OF THE PRESENT INVENTION

The present invention relates to a magnetic recording and reproducing apparatus, and more particularly to an automatic tracking apparatus for a helical scan type video tape recorder (hereinafter referred to as the "VTR").

FIG. 14 is a diagram illustrating an example of the relationship between the magnetic head width and the track width in a 2-hour mode and an 6-hour mode in a VHS system which is one system utilized by existing home VTRs. In the 6-hour mode, the arrangement is such that the magnetic head width is grater than the track width, the former being 33 μm and the latter 19 μm.

FIG. 15 illustrates an example of the actual measurement of deflection of a video track in the VHS system. Such deflection of the track is caused by mechanical factors such as the machining accuracy of a cylinder around which a video tape is wrapped and unevenness in the tension of the tape around the cylinder, and an S-shaped curve characteristic is displayed. In terms of the effect of the deflection of the track on reproduced signals, since the main cause of the deflection of the track lies in the aforementioned mechanical factors, in many cases no problems are presented when self-recording and reproduction is carried out. In cases other than the self-recording and reproduction, however, a problem arises since a deviation of the track occurs due to the deflection of the track. For this reason, an arrangement is provided in the VHS system such that slant azimuth recording at an azimuth angle of 12° is effected to so as to reduce cross-talk from adjacent tracks. In addition, in the 6-hour mode, the recording track width is set to 1.5-2.0 times the recording track width of 19 82 m so that reproduction of signals will be possible even if some deviation of the track occurs.

FIG. 16 illustrates the relationship between the magnetic head and a recording pattern at the time of recording in the 6-hour mode. As is apparent from the drawing, if recording is carried out with a magnetic head having a head width of W μm 1.5-2 times the recording track width of 19 μm, an overwrite region X of W 19 μm occurs. In this region x, low-frequency components and, for video signals, chrominance signals converted in a low-frequency band are apt to be left unerased, a deterioration in picture quality at the time of reproduction.

FIG. 17 illustrates the relationship between the magnetic head and the recording pattern at the time of reproduction in the 6-hour mode. An arrangement is provided such that reproduction is carried out with an X μm-wide magnetic head as compared to the track width of 19μm so that signals can be read even if some track deviation occurs by making use of an azimuth loss. If reproduction of signals is carried out with such a wide magnetic head, the deviation of the track can be coped with, but there is a problem in that the picture quality is unavoidably deteriorated by that margin due to cross-talk from adjacent tracks with respect to low-frequency signals, down converted chrominance signals, etc. that have low azimuth loss.

In such a conventional VHS system, solutions for the deflection of the track caused mainly by mechanical factors have been provided only through the mechanical accuracy of the magnetic head and the like without providing any electrical automatic tracking control.

Since the conventional magnetic recording and reproducing apparatus is arranged, as described above, there has been the drawback that, in a long-recording-/reproducing mode, the deterioration in the picture quality is unavoidable due to the incomplete erasure of low-frequency components at the time of overwrite as well as cross-talk of low-frequency components from adjacent tracks and with a low azimuth loss.

SUMMARY OF THE PRESENT INVENTION

Accordingly, an object of the present invention is to provide a magnetic recording and reproducing apparatus which is capable of obtaining picture quality which is equivalent to that of an ordinary recording and reproducing mode even in the case of a long-recording/reproducing mode, thereby overcoming the above-described drawbacks of the conventional art.

To this end, in accordance with one aspect of the present invention, there is provided a magnetic recording and reproducing apparatus comprising: an actuator for wobbling a magnetic head perpendicularly to a longitudinal direction of a recording track having an azimuth angle; and a tracking servo system for performing tracking by means of the wobbling using the actuator, wherein the width of the magnetic head mounted on the actuator is set to substantially 1-1.5 times the width of a recording track.

In the magnetic recording and reproducing apparatus in accordance with this aspect of the present invention, since the width of the magnetic head mounted on the actuator is set to substantially 1-1.5 times the width of the recording track, a dead zone which is a region where the sensitivity in the wobbling servo system is low, can be made small, so that a more linear tracking error signal can be obtained. In addition, the amount of cross-talk from adjacent tracks can be held to a low level. Furthermore, even in the long-recording and reproducing mode as well, it is possible to reduce the amount of a down converted chrominance signal left unerased at the time of overwrite, as well as as well as cross-talk of a low-frequency-converted chrominance signal from adjacent tracks at the time of reproduction, which have been factors deteriorating the picture quality. Thus, it is possible to obtain the advantage that the picture quality can be enhanced.

In addition, another object of the present invention is to provide a multi-functional, high-performance, and low-cost magnetic recording and reproducing apparatus which is capable of effecting high-accuracy automatic tracking during normal reproduction and effecting automatic tracking which does not produce a noise bar even during special reproduction (high-speed reproduction, slow reproduction, and a still, etc.).

To this end, in accordance with another aspect of the present invention, there is provided a magnetic recording and reproducing apparatus wherein, by using an electromagnetic driven actuator, a wobbling frequency is selected at a level between a primary resonance frequency of the actuator and a secondary resonance frequency thereof at a point where the phase has lagged 180° and as a frequency which is a multiple of the rotational frequency of a rotating drum, and wherein a wobbling signal component extracted from an envelope of a reproduced output from a magnetic head is inverted and is multiplied with a driving signal for the actuator so as to obtain a tracking error signal, and the tracking error signal is subjected to negative feedback to the actuator.

Thus, an arrangement is provided such that the wobbling frequency is selected at a high level even if the electromagnetically driven actuator which has a drawback in that the mechanical resonance point is low is used, the phase of the wobbling driving signal and the phase of the wobbling signal component extracted from the reproduced envelope signal are made identical and are then inputted to a synchronous detection circuit or a multiplier, and a phase shifter is provided. Accordingly, there is an advantage in that it is possible to obtain a magnetic recording and reproducing apparatus which permits high-precision tracking, improves the picture quality, and does not produce a noise bar even at the time of special reproduction.

Furthermore, still another object of the present invention is to provide a magnetic recording and reproducing apparatus which, in cases where rotating magnetic heads including a movable magnetic head and a fixed magnetic head are present, is capable of ensuring that the movable head will not undergo a deviation from the track during tracking, and the fixed head will not undergo a deviation from the track with respect to a low frequency excluding a component due to track deflection, of increasing a low-frequency gain of a tracking control system, and of minimizing a deviation with respect to the track offset.

To this end, in accordance with still another aspect of the invention, there is provided a magnetic recording and reproducing apparatus comprising: an electromagnetically driven actuator for displacing a magnetic head; feedback means which is adapted to wobble the actuator so as to detect a tracking error signal from information on a reproduced envelope at that time, and extract a relatively high-frequency component including one due to track deflection up to a servo band frequency from this tracking error signal so as to feed back the extracted component to the actuator; and means which is adapted to extract a relatively low-frequency component including a track deviation component from a direct current of the tracking error signal and add the extracted component to the phase control signal of the capstan motor subjected to phase control by means of a control signal written in a linear track on a magnetic tape.

Since the control system in accordance with this aspect of the present invention is arranged such that the tracking error signal is frequency-divided by a filter, and the high-frequency component is fed back to the electromagnetically driven actuator and the low-frequency component to the phase control system of the capstan motor, it is possible to effect the tracking control of a fixed magnetic head through feedback to the capstan motor. At the same time, it is possible to effect the tracking control of a movable magnetic head through feedback to the electromagnetically driven actuator.

The above and other objects, features and advantages of the present invention will become more apparent from the following detailed description of the invention when read in conjunction with the accompanying drawings.

BRIEF DESCRIPTION OF THE DRAWINGS

FIGS. 4A and 4B are diagrams illustrating the relationship between a magnetic head width and a track width in the 2-hour mode and the 6-hour mode, respectively, in accordance with this embodiment;

FIG. 6 is a schematic vertical cross-sectional view of an electromagnetically driven voice-coil type actuator in accordance with this embodiment;

FIG. 9 is a waveform diagram illustrating the relationship in phase and amplitude between a wobbling drive signal on the one hand, and a wobbling signal extracted from a reproduced envelope signal at each position of track deviation shown, in FIG. 8 on the other;

FIG. 10 is a waveform diagram of a synchronous phase detection output signal at each position of track deviation shown in FIG. 8;

DESCRIPTION OF THE PREFERRED EMBODIMENTS

Referring now to the accompanying drawings, a description will be given of the preferred embodiments of the present invention applied to a VHS system which is one of the existing home VTR systems.

Figure 1:
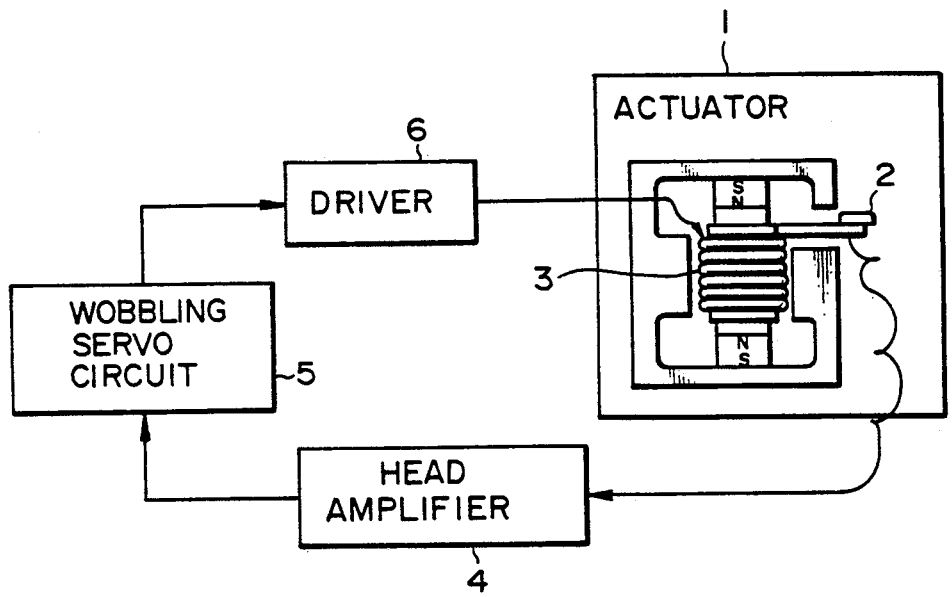
FIG. 1 is a block circuit diagram illustrating a configuration of an essential portion of a magnetic recording and reproducing apparatus in accordance with a first embodiment of the present invention.

FIG. 1 is a block circuit diagram of a first embodiment of the present invention. In the drawing, an electromagnetically driven actuator 1 is adapted to displace a magnetic head 2 for recording and reproducing signals in the transverse direction of recording tracks on a magnetic tape. The magnetic head 2 is disposed on the movable portion of the actuator 1. A head amplifier 4 amplifies reproduced signals from the magnetic head 2. A wobbling servo circuit 5 effects control in such a manner that the magnetic head 2 constantly performs a just tracking on the basis of a signal representing an envelope from the head amplifier 4. A driver 6 amplifies a control output signal from the wobbling servo circuit 5 and then supplies the same to a drive coil 3 of the actuator 1.

Figure 2:
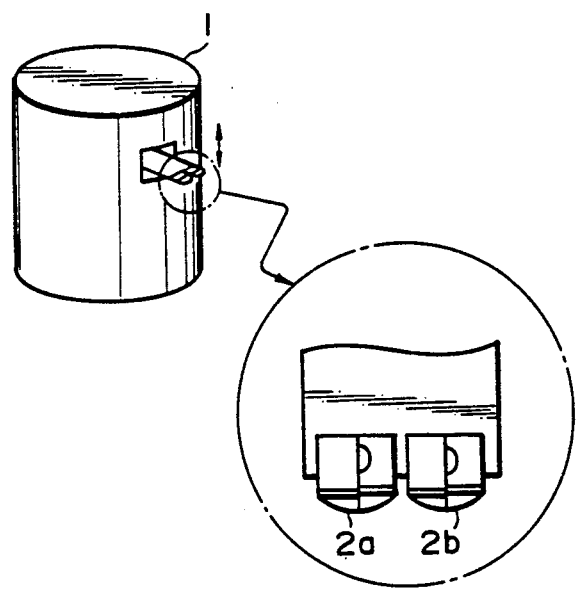
FIG. 2 is a diagram illustrating the arrangement of an actuator and a head that are component elements of this embodiment.

FIG. 2 is a perspective view of the actuator 1 and an enlarged top plan view of the magnetic head 2 mounted on a driving portion of the actuator 1. In the drawing 2a denotes a recording and reproducing head for the 2-hour mode, while 2b denotes a recording and reproducing head for the 6-hour mode.

A description will now be given of the operation of this embodiment. First, a brief description will be given of a wobbling tracking servo system for allowing the magnetic head 2 to constantly perform a just tracking.

A sinusoidal wave of a fixed frequency (hereinafter referred to as the wobbling frequency) is outputted from the wobbling servo circuit 5, and its signal is amplified by the driver 6 and is supplied to the drive coil 3 of the actuator 1 so as to wobble the magnetic head 2. This reproduced output signal from the wobbling magnetic head 2 is supplied to the head amplifier 4 where it is amplified, thereby producing a reproduced envelope signal. This reproduced envelope signal is supplied to the wobbling servo circuit 5. The following operation takes place in the wobbling servo circuit 5. In other words, a signal representing an amount of positional deviation of the magnetic head 2 relative to a recording track can be fetched by allowing the reproduced envelope from the head amplifier 4 to pass through a band-pass filter for the wobbling frequency, a synchronous detection circuit, and a smoothing circuit. This signal representing an amount of relative positional deviation is inverted by a predetermined gain and is added to the sinusoidal wave signal of the wobbling frequency. If this composite signal is supplied to the driver 6, the servo system is closed so as to function in such a manner that the amount of relative deviation is reduced.

Figure 3B:
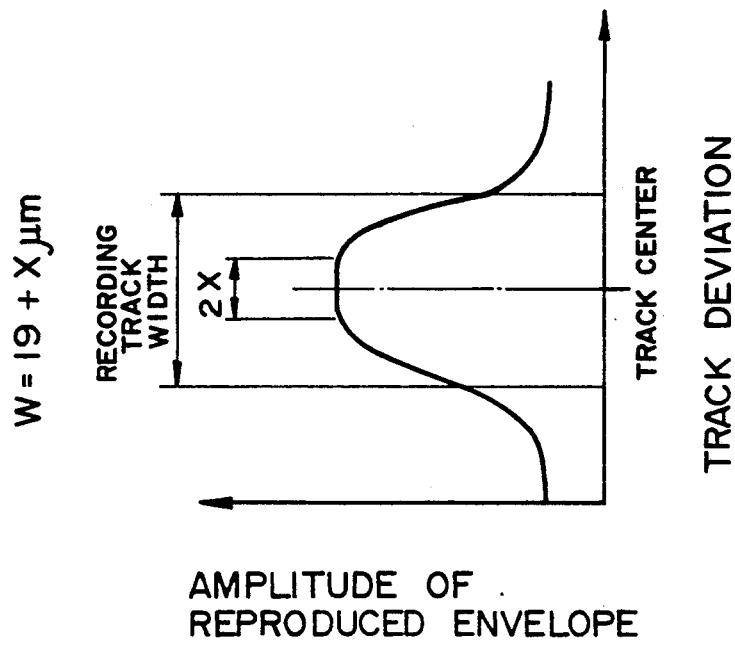
FIGS. 3A and 3B are diagrams illustrating the relationship between the deviation of a track and the amplitude of a reproduced envelope with respect to varied recording track widths.
Figure 3A:
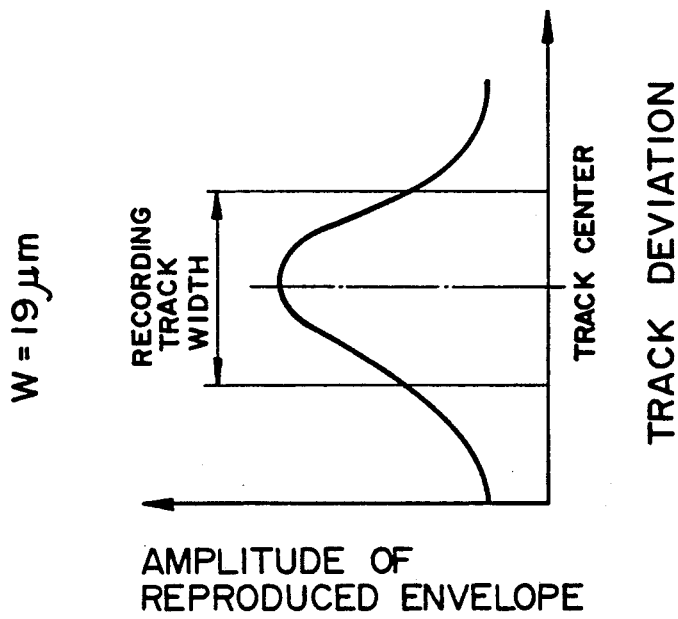

Information on wobbling contained in the reproduced envelope used for detecting the amount of relative deviation differs depending on the relationship between the recording track width and the magnetic head width, as shown in FIGS. 3A and 3B. That is, when the magnetic head width W is equal to the recording track width 19 μm, the amplitude of the reproduced enveloped corresponds to the information on track deviation, as shown in FIG. 3A. However, when the magnetic head width W is wider than the track width 19 μm by X μm, a dead zone in which there is no change in the amplitude of the reproduced envelope with respect to the track deviation occurs in the section of 2x shown in FIG. 3B. It can be understood that, in terms of the detection by the servo system, the smaller the width of the dead zone, the better, and that, in view of the effect of cross-talk from adjacent tracks due to a wide head, the closer to zero the value x, the better. In other words, the closer to the recording track width the magnetic head width is, as shown in FIGS. 4A and 4B, the more convenient it is on the part of the servo system, and the less noise is produced than the reproduced signal. However, this applies to the case where a sufficient control band is provided for the tracking servo system, and there can be cases where the servo system does not function in a narrow control band depending on the frequency characteristic or the like of the actuator. In such a case, it suffices if the servo system is configured by setting the value x to one which corresponds to an amount of track deflection which cannot be followed by the servo system.

The foregoing description has been given of the case of reproduction in the 6-hour mode of the VHS system for the existing ½ inch home VTRs. However, in the case of the 2-hour mode as well, it is possible to perform the tracking on the basis of an utterly similar basic principle and select a head width. Nevertheless, in view of the aforementioned overwrite and cross-talk from adjacent tracks, it is preferred that the head width is set within 1.5 times the track width. In this case, since the servo system can be used commonly for each mode, it is possible to adopt an arrangement in which two-mode heads are mounted on the actuator to eliminate waste.

If the above-described arrangement is adopted, it is possible to provide a magnetic recording and reproducing apparatus which is capable of obtaining images that are less susceptible to the deterioration of picture quality even in the long-play mode.

It should be noted that although in the above-described embodiment a description has been given of a case where the present invention is applied to a VTR of the VHS system which is one of the existing home VTR systems, the present invention also displays a similar effect when applied to other existing home VTR systems, such as the S.VHS system, β system, ED β system, SHB β system, and the like.

Figure 5:
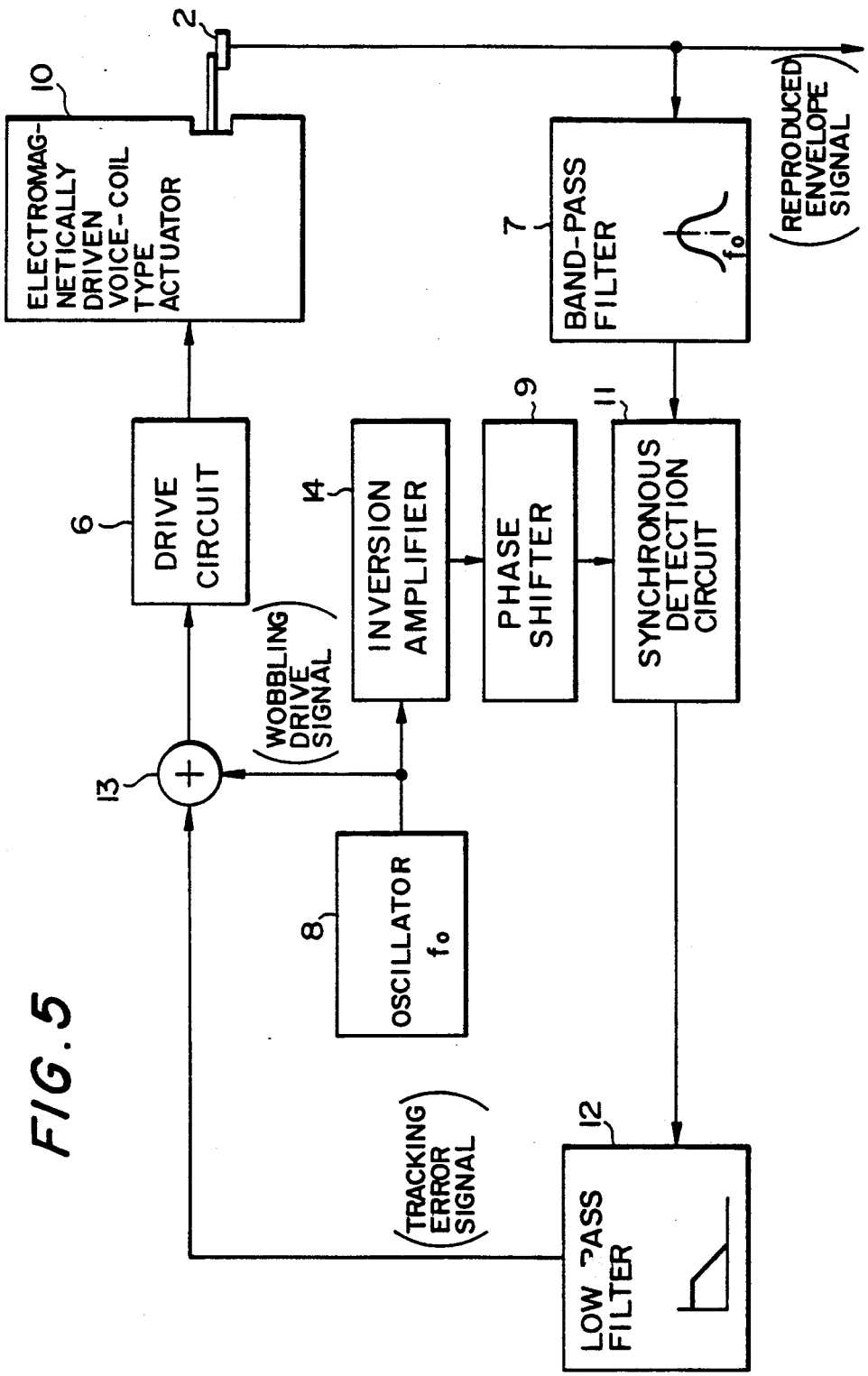
FIG. 5 is a block circuit diagram of a magnetic recording and reproducing apparatus in accordance with a second embodiment of the present invention.

FIG. 5 is a block circuit diagram of a magnetic recording and reproducing apparatus in accordance with a second embodiment of the present invention. In this embodiment, the apparatus mainly comprises the following components: an electromagnetically driven actuator 10 which is an electromechanical transducer; 8, an oscillator which produces a sinusoidal wave signal of a frequency of set between a primary resonance frequency and a secondary resonance frequency, i.e., in a region where the phase of the actuator 10 lags 180°; an inversion amplifier for inverting 180° the phase of a signal of a fixed frequency from the oscillator 8; a magnetic head 2 bonded to the actuator 10; a drive circuit 6 for wobbling the actuator 10; a band-pass filter 7 for extracting the wobbling frequency contained in the reproduced signal from the magnetic head 2; a phase shifter 9 for performing the operation of matching a wobbling drive signal with the phase of the actual wobbling action of the actuator 10; a multiplier or synchronous detection circuit (hereinafter referred to as the synchronous detection circuit) which includes an inversion amplifier, a forward rotation amplifier, a waveform forming circuit, and an analog switch and is adapted to multiply the signal from the phase shifter 9 by the signal from the band-pass filter 7 or perform synchronous detection for the signals; a low-pass filter 12 for restricting a band of an output signal from the synchronous detection circuit 11; and an adder 13.

FIG. 6 is a schematic vertical cross-sectional view of the electromagnetically driven actuator which mainly comprises the following: permanent magnets 21a, 21b; disk-shaped yokes 22a, 22b; a cylindrical yoke 23; a center pole 24; gimbal springs 25a, 25b; a bobbin 26; and a coil 27. The bobbin 26 and the coil 27 constitute a moving coil 28. The upper and lower ends of the moving coil 28 are held by the gimbal springs 25a, 25b. If the coil 27 is energized with a driving current, the moving coil 28 is displaced in an axial direction. The magnetic head 2 is secured to an open end of a head supporting member 29. If the actuator is arranged as described above, there are various advantages in that only several volts is needed as the driving voltage, no hysteresis or head inclination occurs, and high reliability can be maintained due to stable characteristics. In addition, the actuator has good durability and can be produced at low cost.

If consideration is given to a case where the actuator is assumed to be a bimorph which is a piezoelectric element, the bimorph is known as an element which is capable of obtaining a large amplitude relative to its driving voltage among piezoelectric elements. The amount of displacement $\xi$ of the bimorph can be expressed by the following formula:

$$\xi = d31 \times V \times \frac{l^2}{t_2} \times SK \times k$$

where
  $\xi$: amount of displacement
  V: applied voltage
  d31: piezoelectric constant
  l: effective length
  t: thickness per piezoelectric body
  SK: electrode coefficient (0.94–0.95)
  k: loss factor (0.9)

Here, the piezoelectric constant d31 is a function of the applied voltage, and its relationship is such that when V is large, d31 also becomes large. In addition, SK and k are constants that are determined by the configuration of an electrode of the bimorph.

The amount of displacement $\xi$ of the bimorph is thus determined by various factors. Nevertheless, in a case where the bimorph is generally used as an actuator for a VTR, a bimorph having a large piezoelectric constant d31 is selected so that a large amplitude and a low mechanical resonance gain can be provided. However, what mainly affects the amount of displacement $\xi$ is the effective length l of the bimorph which is a member of the second power, so that the longer the length of l, the greater amount of displacement $\xi$ can be obtained.

Figure 19:
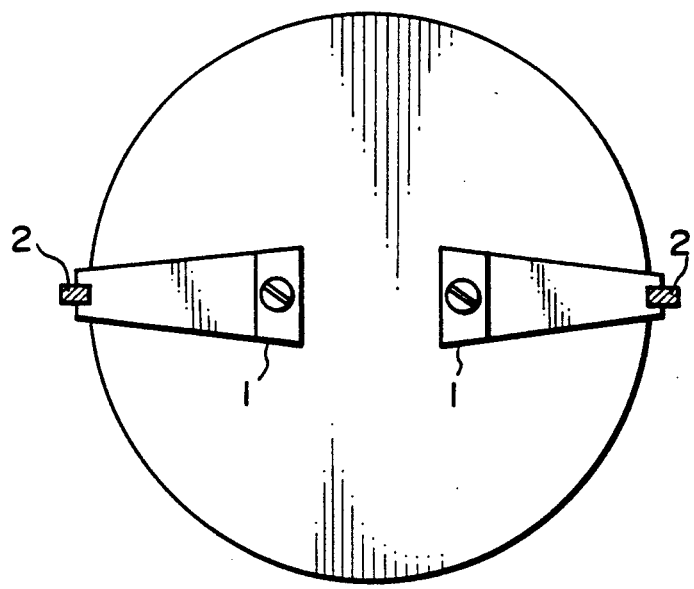
FIGS. 19, 20, and 21 are top plan views illustrating arrangements of a conventional bimorph drum, respectively.
Figure 20:
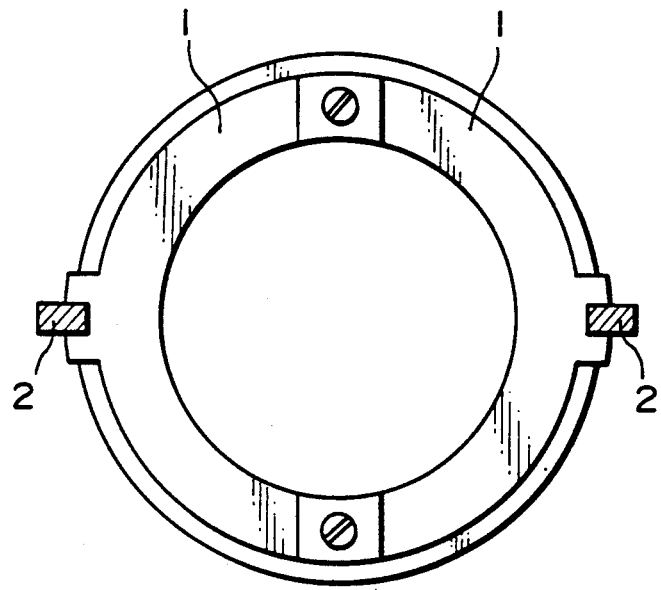
Figure 21:
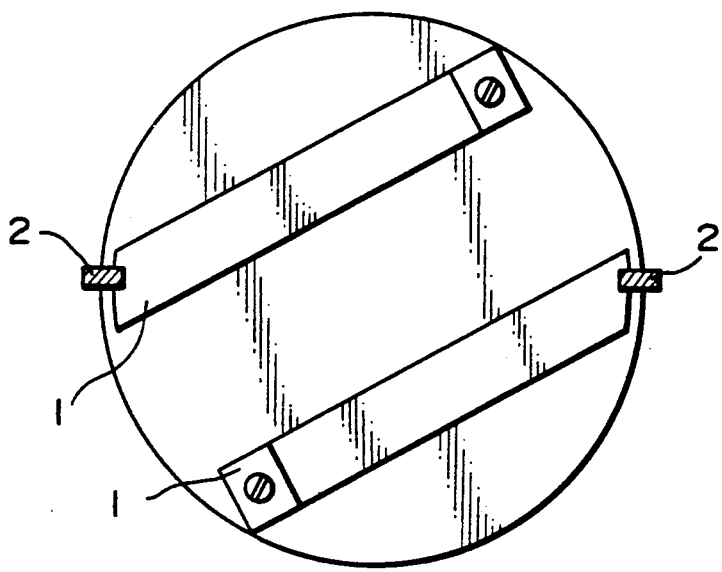

In the light of application to the VHS system, the diameter of the drum on which the actuator is mounted has a certain size, so that the effective length l of the bimorph is naturally restricted. For instance, if the configuration of the bimorph is set as shown in FIG. 19, it is a well-known fact that, in general, a movable range of 700 μm cannot be provided. For this reason, various measures are devised to make the effective length of a bimorph large within a limited diameter of the drum. However, even if the amount of displacement $\xi$ is made large by making the effective length large as in the example of an annular bimorph shown in FIG. 20 or as in the example shown in FIG. 21, the following problems are encountered.

Figure 22:
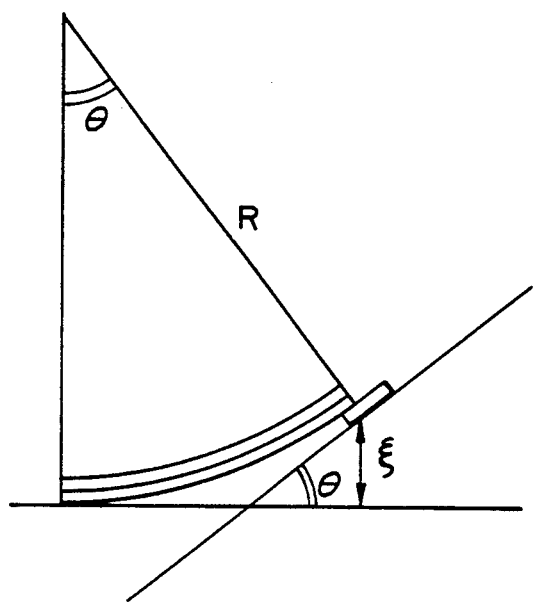
FIG. 22 is a diagram illustrating the relationship among an amount of displacement of the bimorph, an effective length thereof and a head inclination.

FIG. 22 is a diagram illustrating the relationship between the effective length of a bimorph and the inclination of the magnetic head. The relationship among the amount of displacement $\xi$, the effective length l, and the head inclination $\theta$ can be expressed by the following formula:

$$\xi = R\left(1 - \cos\frac{l}{R}\right)$$

$$\theta = 360 \times \frac{l}{2\pi R}$$

$$\therefore \xi = \frac{l}{2} \cdot \frac{\pi\theta}{180}$$

Figure 23:
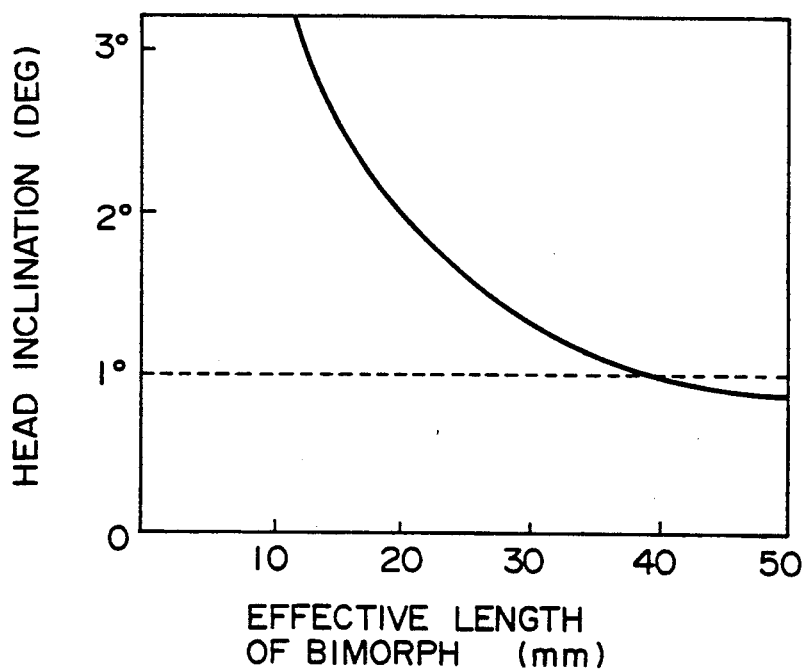
FIG. 23 is a diagram illustrating the relationship between the effective length of the bimorph and the head inclination.

FIG. 23 illustrates the relationship between the effective length of a bimorph and the head inclination in the case of an amount of movement $\xi = 348$ μm necessary at the time of reproduction at a five-times greater speed in the opposite direction in the VHS system. Since the head inclination leads to the deterioration in the picture quality, the limit of the angle of inclination is generally regarded as less than 1°. In this case, the fact that the head inclination is less than 1° means that the effective length is 40 mm or more. The diameter of the drum in the case of the VHS system is 62 mm, and it is possible to set the effective length at 40 mm or more by making the bimorph into an annular configuration or various other methods. However, since the effective length cannot be made infinitely long due to the drum size, and since the head inclination becomes close to 1°, deterioration in the picture quality is unavoidable.

In addition, there occurs the problem that a high voltage (100 V to several hundred volts) is required for driving the bimorph.

Figure 7:
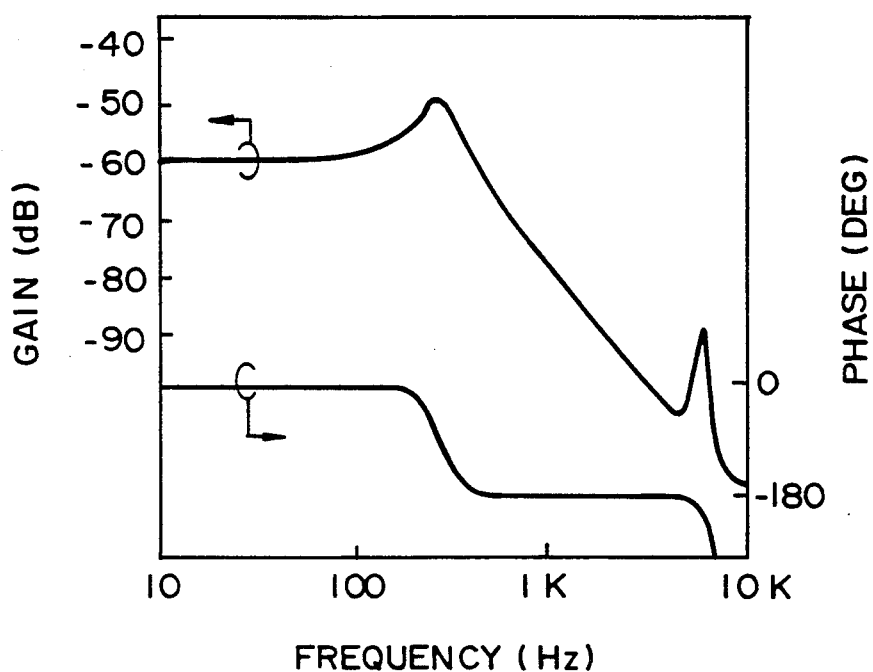
FIG. 7 is a frequency characteristic diagram of the electromagnetically driven voice-coil type actuator.
Figure 18:
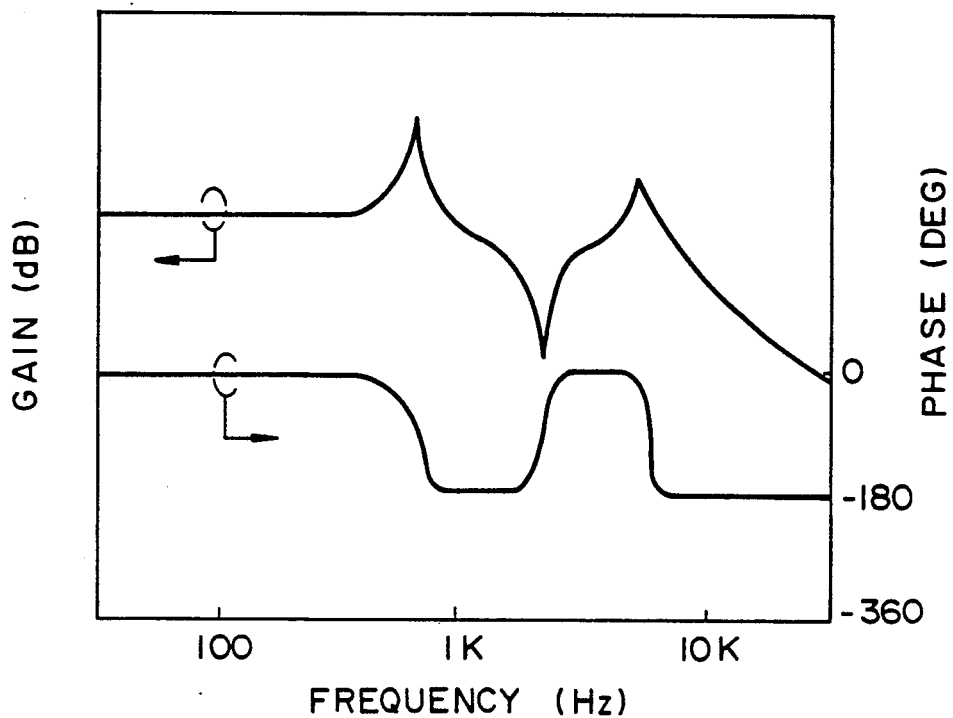
FIG. 18 is a schematic diagram illustrating a general frequency characteristic of a bimorph in accordance with a conventional example.

However, such an electromagnetically driven actuator generally has a drawback in that the mechanical resonance point is low. FIG. 7 illustrates a frequency characteristic of the electromagnetically driven actuator. As apparent from the drawing, the primary resonance frequency is 300 Hz, and the secondary resonance frequency is 7 kHz, and it can be seen that this type of actuator has a low characteristic as compared with the bimorph shown in FIG. 18.

A consideration is now given to a case where the wobbling frequency is selected in a frequency band which is lower than the primary resonance frequency. For instance, in a case where the wobbling frequency is set at, for instance, 60 Hz, the servo band becomes several Hz, so that it becomes impossible to follow the pattern of track deflection (30 Hz, 60 Hz, 120 Hz, etc.).

Accordingly, a consideration is given to a case where the wobbling frequency is selected in a frequency band between the primary resonance frequency and the secondary resonance frequency, i.e., a region where the phase of the actuator lags 180°. In the case of this embodiment, for example, if the wobbling frequency is assumed to be 720 Hz, the servo band extends up to 60 Hz or thereabouts, and it becomes possible to follow the pattern of track deflection. However, since the phase of the actuator lags 180°, the phase of the wobbling frequency component of the reproduced envelope lags 180° as compared to the conventional example. For this reason, in this embodiment, this problem is overcome by inserting the inversion amplifier 14 for inverting 180° the phase of the wobbling signal from the oscillator 8. Incidentally, it goes without saying that a similar effect can be obtained if the inversion amplifier 14 is inserted between the band-pass filter 7 and the synchronous detection circuit 11.

Figure 8:
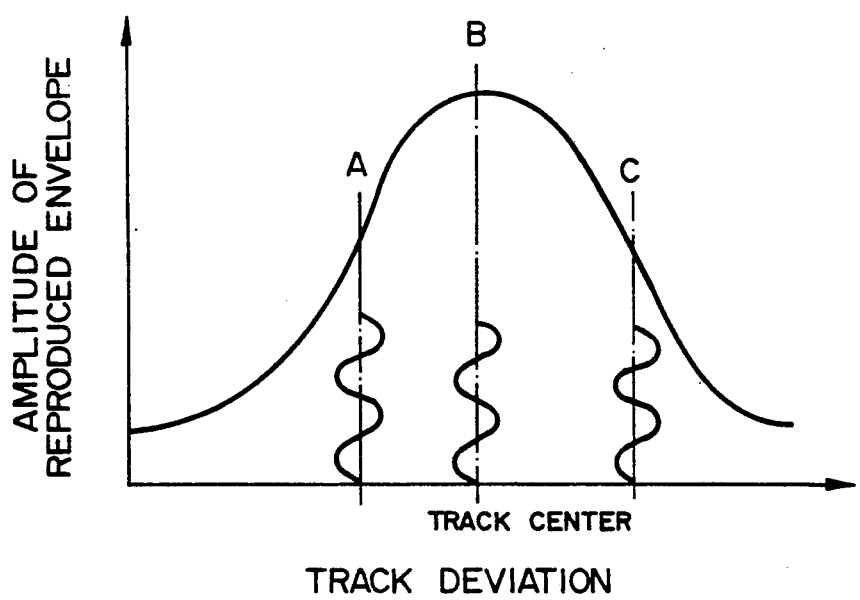
FIG. 8 is a diagram illustrating fluctuations in the amplitude of the envelope of a reproduced signal from a magnetic held with respect to the deviation of the track.

FIG. 8 is a diagram illustrating the variation in the amplitude of the reproduced envelope signal from the magnetic head 2 with respect to the amount of track deviation. In the drawing, A denotes a position offset leftwards from the center of the track; B, a track center; and C, a position offset rightwards from the track center.

FIG. 9 is a diagram in which the reproduced signal of the magnetic head 2 at the respective positions A, B and C of track deviation, after passing through the band-pass filter 7, is plotted as coordinates, and time is plotted as abscissas. In the drawing, (W) shows the wobbling waveform of the actuator 10; (a), the waveform of an output signal from the band-pass filter 7 when the magnetic head 2 is offset to position A; (B), the waveform of an output signal from the band-pass filter 7 when the magnetic head 2 is at position B; (C), the waveform of an output signal from the band-pass filter 7 when the magnetic head 2 is offset to position C.

In FIG. 10, (A), (B), and (C) show the waveforms of output signals after synchronous detection at track positions A, B, and C of the magnetic head 2 in the same way as (A), (B), and (C) of FIG. 9.

The amplitude of the envelope signal reproduced by the magnetic head 2 varies with respect to the deviation of the track, as shown in FIG. 8. At this juncture, if the actuator 10 is driven by the drive circuit 6 by means of a sinusoidal wave signal produced by the oscillator 8, the magnetic head 2 wobbles in the form of sinusoidal waves relative to the recording track. If the signal thus generated is allowed to pass through the band-pass filter 7 which allows only the wobbling frequency of the reproduced envelope of the magnetic head 2 obtained at this time to pass therethrough, signals shown at (A), (B), and (C) in FIG. 9 are obtained in correspondence with the amount of track deviation.

If the magnetic head 2 is made to wobble at point A (in a case where it is offset leftwards relative to the track center) in FIG. 8, a signal shown at (A) in FIG. 9 in which the phase is inverted with respect to the wobbling waveform (at (W) in FIG. 9) of the magnetic head 2 is obtained as the output of the band-pass filter. In the case of the opposite point C, a signal of an identical phase illustrated at (C) in FIG. 9 is obtained. In the case of point B which is the track center, a signal of the frequency which is double the wobbling frequency is obtained, but since frequency falls outside the passable band of the band-pass filter, so that the amplitude of the signal is attenuated, resulting in the signal such as the one shown at (B) in FIG. 9.

Next, if the waveform W representing the movement of the magnetic head 2 and the waveforms A to C which have passed through the band-pass filter 7, the waveforms being shown in FIG. 9, are subjected to synchronous detection by the synchronous detection circuit 11, it is possible to obtain waveform signals such as those shown at (A), (B), and (C) in FIG. 10 with respect to the points of relative positional deviation A, B, and C. At this juncture, the phase of the waveform W representing the movement of the magnetic head 2 and the phase of the sinusoidal wave generated by the oscillator 8 do not necessarily coincide with each other by the rotation of the phase resulting from the mechanical resonance or the like provided by the actuator. Consequently, after the amount of phase offset is adjusted by the phase shifter 9, and is then inputted to the synchronous detection circuit 11. The synchronous detection circuit 11 operates in such a manner as to turn the analog switch to the forward rotation amplifier side when the wobbling waveform W is positive, and turn the analog switch to the inversion amplifier side when the wobbling waveform W is negative.

Finally, by smoothing the output signal of the synchronous detection circuit 11 by means of the low-pass filter 12, a signal (hereinafter referred to as the tracking error signal) corresponding to the amount of positional deviation of the magnetic head 2 relative to the recording track is obtained. By feeding back this signal to the actuator 10 which moves the magnetic head 2 in the direction in which the amount of relative positional deviation converges, the tracking control system is formed.

It should be noted that the wobbling signal for wobbling the actuator 10 plus the feedback signal corresponding to the amount of relative positional deviation are consequently inputted to the drive circuit 6 for driving the actuator.

In the above-described embodiment, although the tracking error signal is formed by means of the synchronous detection circuit, the tracking error signal may be formed by being multiplied by a multiplier.

In addition, although in the above-described embodiment a description has been given of a case where the present invention is applied to a VTR of the VHS system which is one of the existing home ½ inch VRT systems, the present invention also displays a similar effect when applied to other existing home ½ inch VTR systems, such as the S-VHS system, β system, ED β system, and the like.

Furthermore, in this embodiment it is possible to enhance the picture quality by making the magnetic head width 1 to 1.5-fold the recording track width in the same way as the first embodiment.

Figure 11:
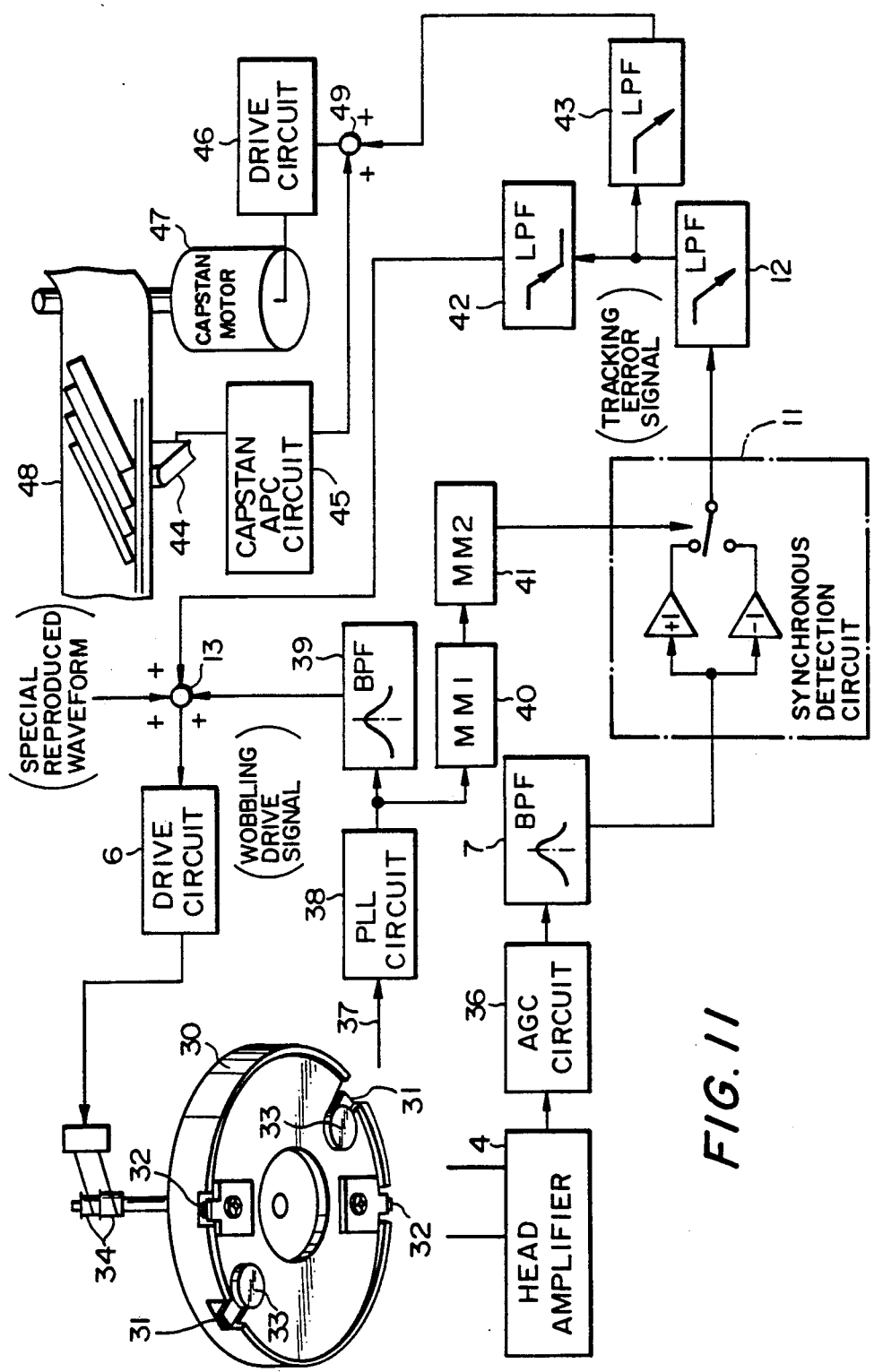
FIG. 11 is a block circuit diagram of a magnetic recording and reproducing apparatus in accordance with a third embodiment of the present invention.

FIG. 11 is a block circuit diagram of a magnetic recording and reproducing apparatus in accordance with a third embodiment of the present invention. In this embodiment, the apparatus mainly comprises the following components: a rotating drum 30; a movable magnetic head 31; a fixed magnetic head 32; an electromagnetically driven actuator 33; a slip ring 34 for supplying a driving current; a head amplifier 4; an automatic gain control circuit (hereinafter referred to as the AGC circuit) 36 for controlling such that the amplitude of a reproduced envelope, i.e., an output from the head amplifier 4, is constantly fixed with respect to variations in a magnetic system; a rotational phase signal 37 output from a rotary encoder for detecting the rotational phase of the rotating drum 30; a phase-locked loop circuit (hereinafter referred to as the PLL circuit) 38 for generating a signal of a frequency phasewise synchronous with the output 37 of the rotary encoder; a band-pass filter 39 for allowing only the wobbling frequency to pass therethrough so as to shape a rectangular wave from the PLL circuit 38 into a sinusoidal wave; monostable multivibrator circuits (hereinafter referred to as the mono-multi circuits) 40, 41 for offsetting only the phase of the output pulse of the PLL circuit; a lag-lead type low-pass filter 42 indicating a phase lag-lead characteristic; a lag-type low-pass filter 43 having only a phase lag characteristic; a control head 44 for reading a control signal written in a linear track of a magnetic tape 48; a capstan motor 47; a capstan phase control circuit (hereinafter referred to as the capstan APC (automatic phased lock) circuit) 45 for synchronizing the phase of the capstan motor 47 with a signal from the control head 44; a drive circuit 46 for driving the capstan motor 47; the magnetic tape 48; and an adder 49.

Figure 12:
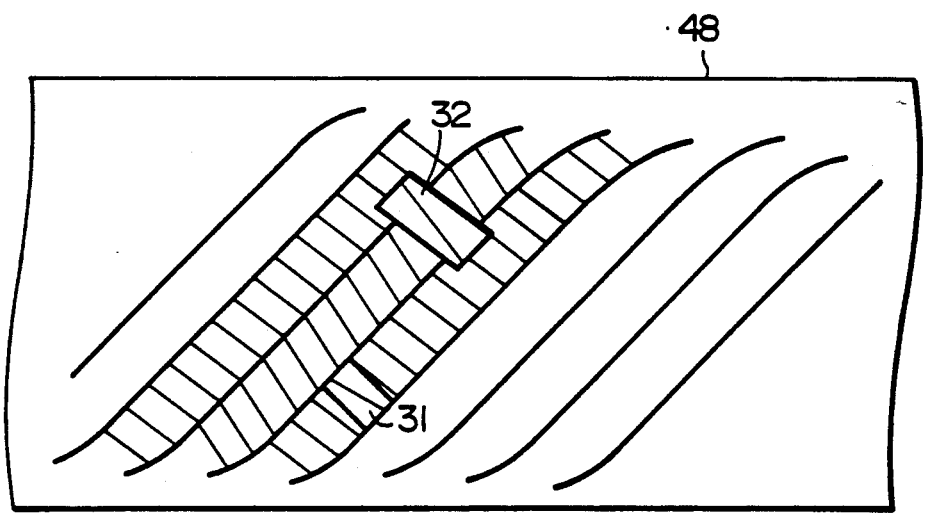
FIG. 12 is a diagram illustrating a scanning position of a magnetic head in accordance with this embodiment.

FIG. 12 is a diagram illustrating how the magnetic heads 31, 32 perform tracking on the magnetic tape 48. In the drawing, the tracking positions of the fixed head 32 and the movable head 31 are shown in a case where a low-frequency component in the tracking error signal is fed back to the capstan motor 47.

Figure 13A:
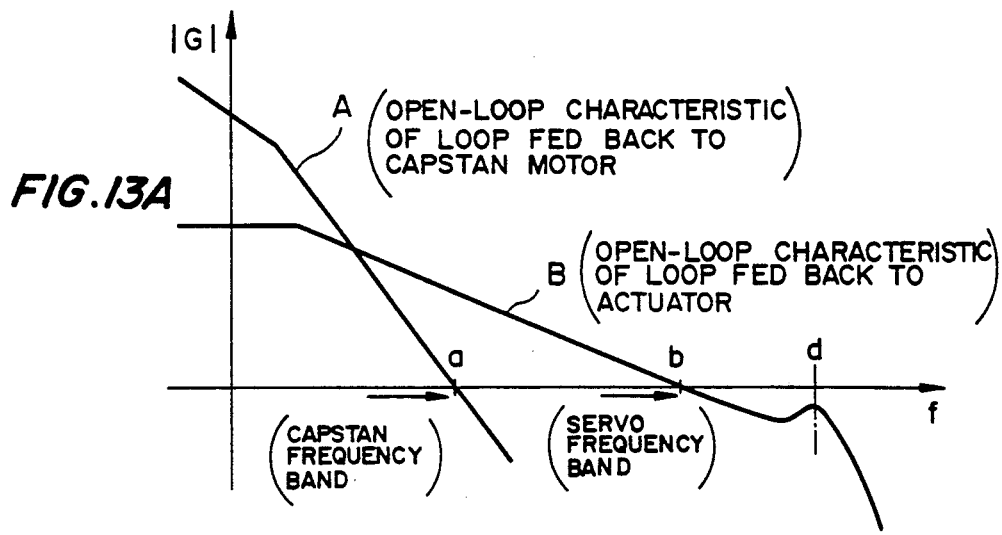
FIGS. 13A, 13B and 13C are diagrams illustrating an open-loop characteristic of a control system, a frequency characteristic of an electromagnetically driven actuator, and an output characteristic of a capstan motor, respectively, in accordance with the embodiment.
Figure 13B:
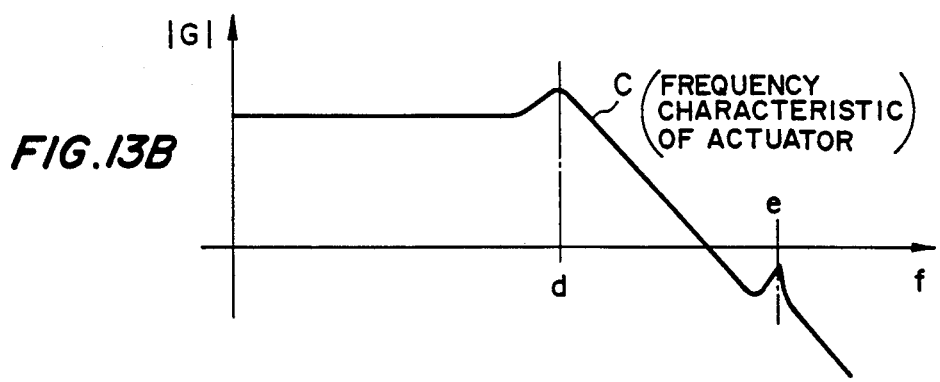
Figure 13C:
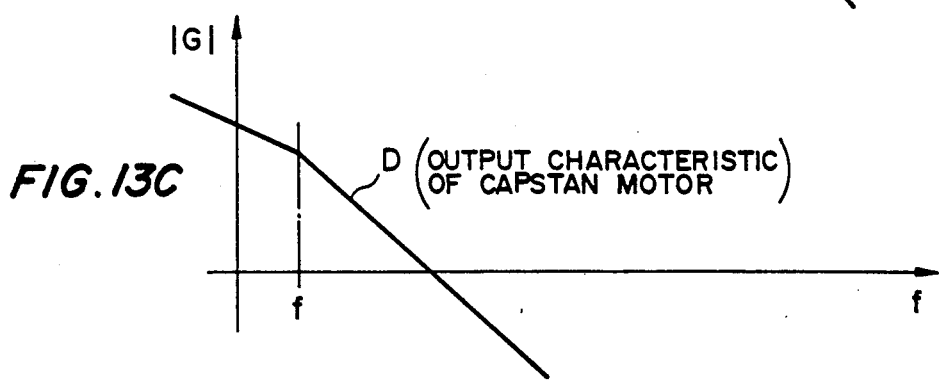
Figure 14A:
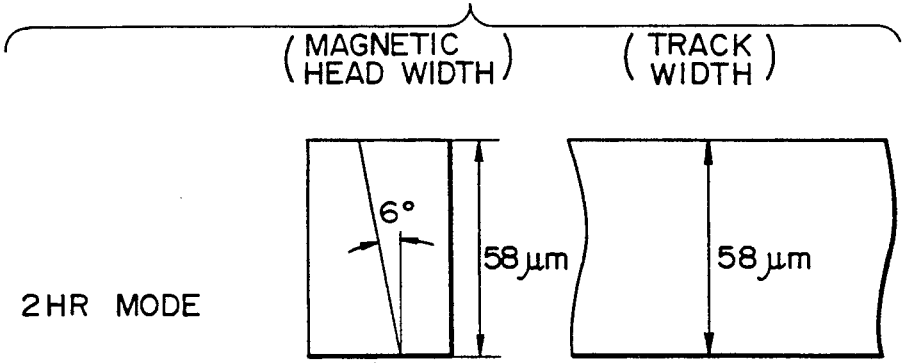
FIGS. 14A and 14B are diagrams illustrating the relationship between a magnetic head width and a track width in the 2-hour mode and the 6-hour mode, respectively, in accordance with a conventional VHS system.
Figure 14B:
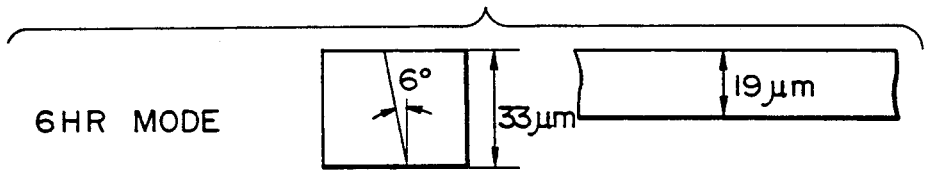
Figure 15:
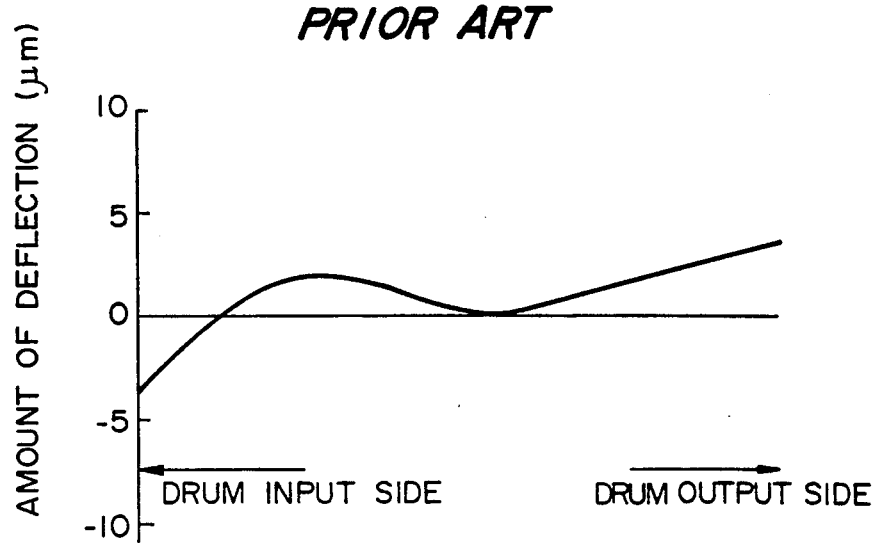
FIG. 15 is a diagram illustrating a pattern of deflection of tracks on a magnetic tape in accordance with said conventional example.
Figure 16:
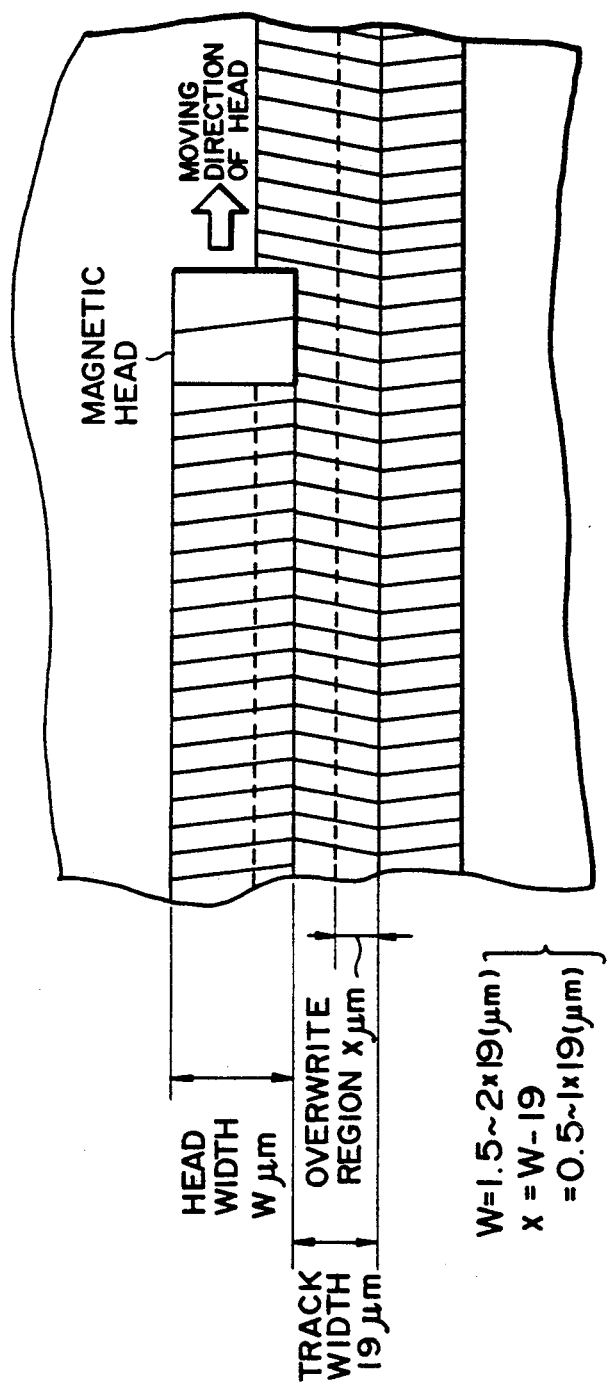
FIG. 16 is a diagram illustrating the relationship between recording tracks and the scanning positions of a magnetic head/during recording in the long-play mode.
Figure 17:
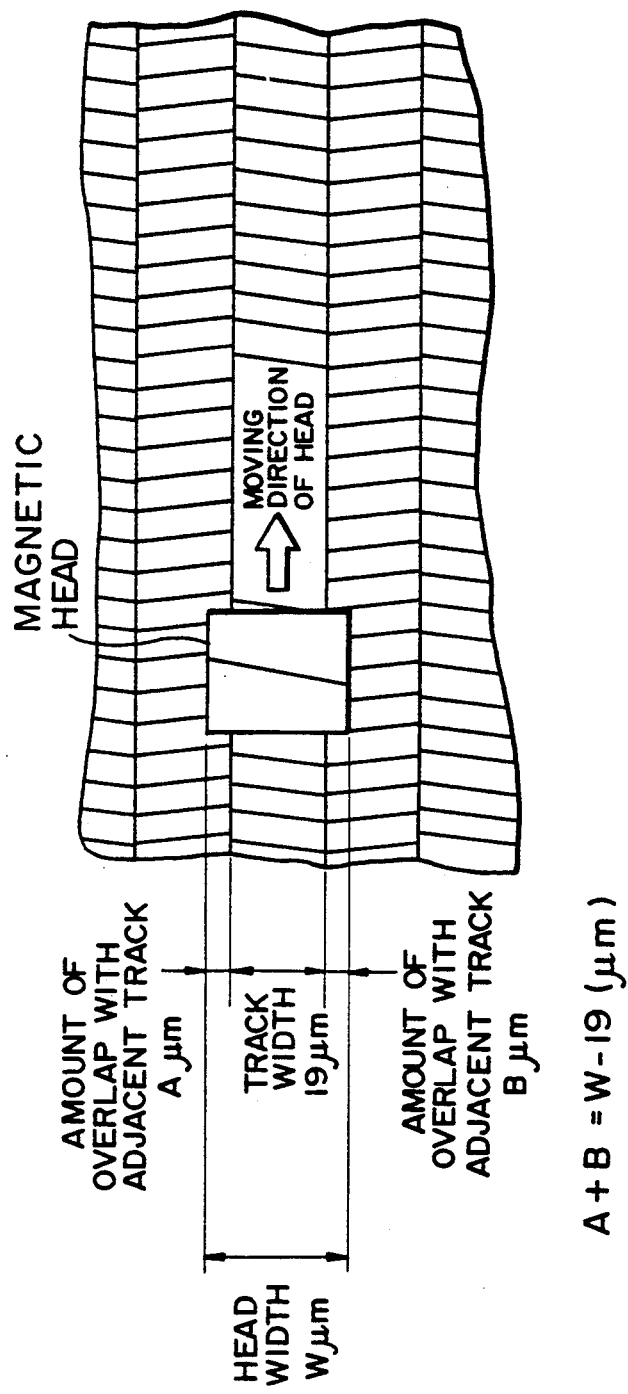
FIG. 17 is a diagram illustrating the relationship between recording tracks and the scanning positions of the magnetic head during reproduction in the long-play mode.

FIGS. 13A, 13B, and 13C are diagrams illustrating an open-loop characteristic of the control system, a frequency characteristic of the electromagnetically driven actuator, and a frequency characteristic of the capstan motor, respectively. In FIG. 13A, characteristic A shows an open-loop characteristic of the loop feeding back to the capstan motor 47 in the control system; characteristic B shows an open-loop characteristic of the loop feeding back to the electromagnetically driven actuator 33; and frequency d is a spring resonance frequency of the electromagnetically driven actuator 33.

FIG. 13B is a diagram illustrating a driving current-displacement characteristic of the electromagnetically driven actuator 33 alone, and frequency e is a mechanical resonance frequency of the electromagnetically driven actuator 33.

FIG. 13C is a diagram illustrating a driving current rotational phase characteristic of the capstan motor, and frequency f is a cut-off frequency of a DC motor.

A description will now be given of the operation of this embodiment.

In FIG. 11, by allowing the signal 37 corresponding to the rotational phase of the rotating drum 30 to pass through the PLL circuit 38, it is possible to obtain a frequency necessary for wobbling and a wobbling signal synchronized with the rotation of the rotating drum 30. This has an advantage in that since the jitter component occurring when the reproducing magnetic head 31 is made to wobble is synchronized with the rotation of the rotating drum 30, the jitter attributable to the wobbling is fixed on the TV screen in a case when a video signal or the like of the helical scan system is reproduced, with the result that the jitter becomes difficult to detect by human eyes. The reproduced signal thus obtained by wobbling the movable magnetic head 31 is amplified by the head amplifier 4, thereby obtaining a reproduced envelop signal. If the reproduced envelop signal is allowed to pass through the band-pass filter 7, the synchronous detection circuit 11, and the smoothing circuit 12 via the AGC circuit 36 in such a manner that the amplitude of the reproduced envelope signal becomes constantly fixed with respect to variations in the electromagnetic system, a tracking error signal can be obtained. This tracking error signal is normally fed back to the electromagnetically driven actuator 33 in a direction in which the positional deviation is reduced, but this operation alone does not allow the fixed head 32 to perform a proper tracking. Namely, although the movable head 31 is controlled in such a manner as to perform tracking on the recording track, the movable head 32 fails to perform a proper tracking since a difference in the head level occurs vis-a-vis the movable head 31 by the portion in which the movable head 31 has moved perpendicularly to the scanning direction. However, as in the case of this embodiment, if a relatively low-frequency component is extracted from the DC component of the tracking error signal by the low-pass filter 43 and is added to the phase control loop of the capstan motor 47, it is possible to compensate for the track deviation caused by a low frequency component, by means of the capstan motor.

In other words, the capstan phase control system is phase locked relative to the control signal written in the linear track on the magnetic tape 48. Here, the aforementioned track deviation caused by a low frequency component is absorbed by the capstan phase control system by correcting the rotational phase of the capstan motor 47 relative to the amount of track deviation of the fixed magnetic head 32 within the range locked by the capstan phase control system. Then, if the amount of relative positional deviation containing a component of track deflection and the like excluding the DC component is fed back to the electromagnetically driven actuator 33, the difference in the head level does not occur, and it is possible to allow the fixed head 32 to perform a proper tracking, as shown in FIG. 12. Furthermore, since the movable head 31 is controlled in such a manner as to constantly perform a proper tracking with respect to a track containing a relatively high frequency component such as the track deflection and the like, although the fixed head 32 cannot follow the track deviation caused by a high frequency component such as the track deflection and the like, it is possible to eliminate the track deviation caused by a DC component. In this case, since the movable head 31 is mounted on the electromagnetically driven actuator having a movable portion supported by, for instance, springs, adjustment needs to be carried out so that the difference in the head level vis-a-vis the fixed head 32 at the time of an uncontrolled state, i.e., when the driving current is zero becomes small.

It should be noted that, as the movable head 31, it is possible to use a magnetic head having a width 1-1.5 times the recording track width in order to follow the track deflection as well. If this movable magnetic head 31 is used for video signals, it is possible to minimize the cross-talk of a low frequency having a low azimuth effect, thereby enhancing the picture quality.

In addition, if a magnetic head having a width greater than the recording track pitch is used as the fixed head, since there is no track deflection caused by a low frequency component, reproduction becomes sufficiently possible with respect to a some degree of track deflection, and therefore this fixed magnetic head can also be used for high-fidelity audio equipment.

The amount of displacement with respect to a driving current in a case where the movable portion of the electromagnetically driven actuator is of a type supported by springs shows a characteristic such as the one shown in FIG. 13B, and it is possible to provide a servo frequency band stretching up to a frequency which is slightly lower than the spring resonance frequency d. This is because since there is no phase rotation of the actuator up to the vicinity of the spring resonance frequency d, phase margin can be secured. There is a different method in which, by carrying out phase-lead compensation, the servo frequency band is provided between the spring resonance frequency d and the mechanical resonance frequency e. The driving current-rotational phase characteristic of the capstan motor 47 is shown in FIG. 13C, and since the response speed of the capstan motor 47 is slower than the response speed of the electromagnetically driven actuator 33, the characteristic of the overall tracking control system becomes one in which characteristic C and characteristic D are combined. However, since the characteristic of the capstan motor 47 contains a complete integrator between the rotational speed and the rotational phase in the transmission function of the capstan motor, the lower the frequency, the greater gain the characteristic displays (shown in FIG. 13C). Hence, since there is the advantage of sufficiently securing a low-frequency gain as the characteristic of the overall tracking control system, it is possible to sufficiently ensure the synthesis of the overall control system with respect to the disturbance of low frequencies.

As described above, by using both the capstan motor 47 and the electromagnetically driven actuator 33, it is possible to widen the control band while securing a low-frequency gain for the overall tracking control system.

In addition, in the case of special reproducing modes such as a double speed and a triple speed, if a high-wave triangular waveform signal corresponding to the special reproducing mode is added by the adder 13, the tracking control system operates in such a manner as to correct the movement of the movable head caused by the added triangular wave and the deviation of an actual track, there is no possibility of a track deviation occurring. Accordingly, in a helical scan VTR of an analog system, no noise bar appears on the TV screen, so that special noiseless reproduction can be performed.

What is claimed is:

1. A magnetic recording and reproducing apparatus for recording or reproducing information on a recording medium, comprising:
    a fixed magnetic head and a movable magnetic head mounted on a rotating drum;
    an electromagnetically driven actuator adapted to wobble said movable magnetic head in an axial direction of a recording track on the recording medium;
    driving means for driving said electromagnetically driven actuator with a driving signal of a frequency synchronized with a rotational phase of said rotating drum;
    tracking error signal detecting means for detecting a signal representing a tracking error from a signal component attributable to wobbling from a reproduced signal read by said movable magnetic head and said driving signal;
    first feedback means for extracting a component excluding a DC component from the tracking error signal detected by said tracking error signal detecting means and for feeding back the extracted component to said electromagnetically driven actuator, thereby allowing said movable head to perform tracking on the recording track; and
    second feedback means for extracting a low-frequency component containing a DC component of the tracking error signal detected by said tracking error signal detection and for feeding back the extracted component to a capstan motor for driving the recording medium, thereby allowing said fixed head to perform tracking on the recording track.

2. The magnetic recording and reproducing apparatus according to claim 1, wherein said magnetic head has a width substantially 1–1.5 times a width of a recording track.

3. The magnetic recording and reproducing apparatus according to claim 1, wherein said actuator comprises:
    a pair of permanent magnets disposed with poles having a same polarity opposed to each other;
    a yoke for fixing said pair of permanent magnets and forming a magnetic path together with said pair of permanent magnets;
    a bobbin which is retained around said pair of permanent magnets by a gimbal spring and which si capable of wobbling in an axial direction; and
    an energizing coil wound around said bobbin.

4. The magnetic recording and reproducing apparatus according to claim 1, wherein said driving means comprises:
    a phase-locked loop circuit for oscillating a signal of a frequency having a phase synchronized with a rotational phase signal of said magnetic drum; and
    a band-pass filter for extracting a frequency signal corresponding to a frequency of said driving signal from the signal having its phase synchronized in said phase-locked loop circuit.

5. The magnetic recording and reproducing apparatus according to claim 1, wherein said tracking error signal detecting means comprises:
    a band-pass filter for extracting a frequency signal corresponding to a frequency of said driving signal from a reproduced signal read by said movable magnetic head;
    a synchronous detection circuit for synchronizing a signal extracted from said band-pass filter with said driving signal; and
    a low-pass filter for smoothing a synchronous detection signal from said synchronous detection circuit so as to obtain the tracking error signal.

6. The magnetic recording and reproducing apparatus according to claim 1, wherein said first feedback means comprises:
    a lag-lead type low-pass filter for extracting a component excluding a DC component from the tracking error signal; and
    an adder for adding a signal extracted form said lag-lead type low-pass filter to said driving signal for driving said electromagnetically driven actuator so as to effect feedback.

7. The magnetic recording and reproducing apparatus according to claim 1, wherein said second feedback means comprises:
    a lag type low-pass filter for extracting a low-frequency component including a DC component from the tracking error signal; and
    an adder for adding a signal extracted from said lag type low-pass filter to said driving signal for driving said capstan motor so as to effect feedback.

* * * * *